US011714178B1

(12) United States Patent
Al Ahmad et al.

(10) Patent No.: US 11,714,178 B1
(45) Date of Patent: Aug. 1, 2023

(54) METHOD OF ALIGNING A FIRST ALIGNABLE ELEMENT WITH A SECOND ALIGNABLE ELEMENT AND A SYSTEM IMPLEMENTING THE SAME

(71) Applicant: United Arab Emirates University, Al Ain (AE)

(72) Inventors: Mahmoud F. Y. Al Ahmad, Al Ain (AE); Lillian J. A. Olule, Al Ain (AE)

(73) Assignee: United Arab Emirates University, Al Ain (AE)

( * ) Notice: Subject to any disclaimer, the term of this patent is extended or adjusted under 35 U.S.C. 154(b) by 0 days.

(21) Appl. No.: 17/870,946

(22) Filed: Jul. 22, 2022

(51) Int. Cl.
  *G01S 11/06* (2006.01)
  *G01S 13/42* (2006.01)
(52) U.S. Cl.
  CPC ............... *G01S 11/06* (2013.01); *G01S 13/42* (2013.01)
(58) Field of Classification Search
  CPC ................................ G01S 11/06; G01S 13/42
  See application file for complete search history.

(56) References Cited

U.S. PATENT DOCUMENTS

| | | |
|---|---|---|
| 5,880,681 A | 3/1999 | Codina et al. |
| 10,996,082 B2 | 5/2021 | Iannotti |
| 2014/0243043 A1* | 8/2014 | Shen ............... H01Q 21/065 455/553.1 |
| 2016/0056523 A1 | 2/2016 | Olsson et al. |
| 2018/0062246 A1* | 3/2018 | Hershey ............ H01Q 1/1242 |
| 2018/0083349 A1* | 3/2018 | Sieber ................. H02J 50/90 |
| 2020/0067169 A1* | 2/2020 | Jang ................... H01Q 3/005 |
| 2021/0296756 A1* | 9/2021 | Hon .................. H04B 17/318 |

FOREIGN PATENT DOCUMENTS

| | | |
|---|---|---|
| KR | 20120104866 A | 9/2012 |
| KR | 20130110503 A | 10/2013 |
| WO | 2017217210 A1 | 12/2017 |

* cited by examiner

*Primary Examiner* — Donald H B Braswell
(74) *Attorney, Agent, or Firm* — Boyle Fredrickson, S.C.

(57) ABSTRACT

A method is provided of aligning a first alienable element with a second alignable element. A first article comprises the first alignable element and a second article comprises the second alignable element. A first antenna is coupled to the first alignable element and a second antenna is coupled to the second alignable element. The first antenna is identical to the second antenna. The method comprises: moving a first article relative to a second article; determining, during movement of the first article, at least one S-parameter of the first antenna and at least one corresponding S-parameter of the second antenna; and ceasing the movement of the first article when the at least one S-parameter of the first antenna matches the at least one corresponding S-parameter of the second antenna.

19 Claims, 8 Drawing Sheets

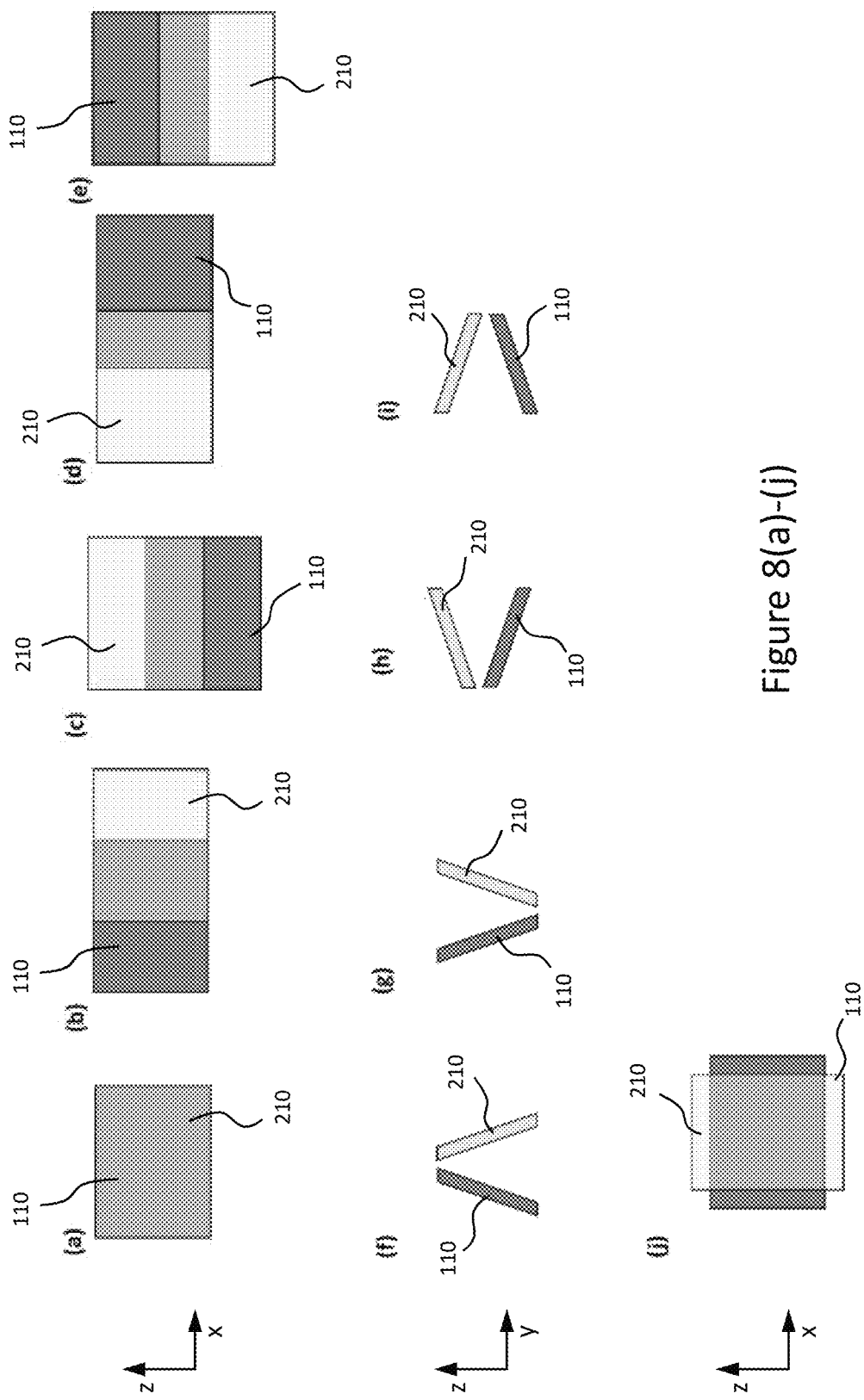
Figure 8(a)-(j)

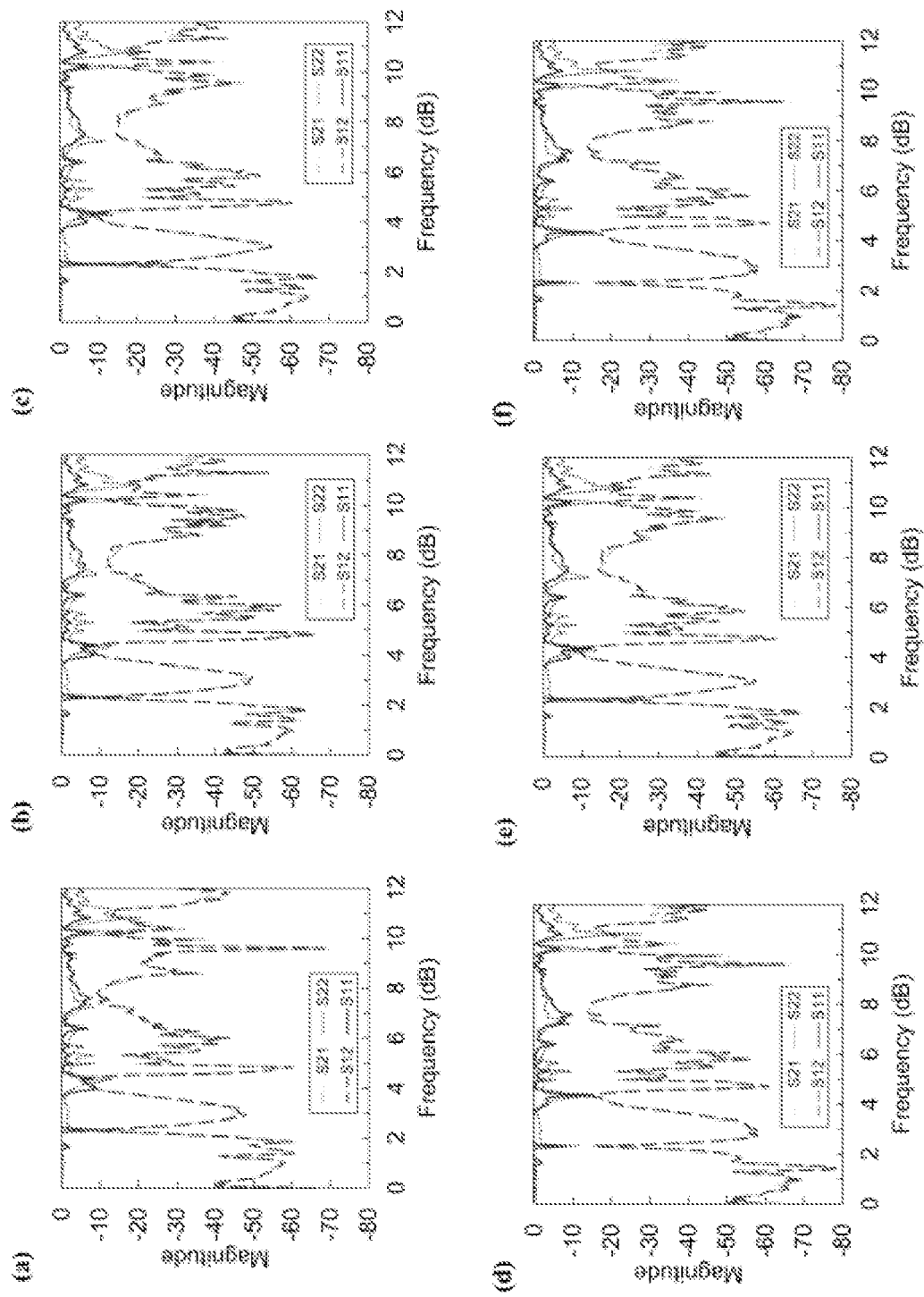
Figure 9(a)-(f)

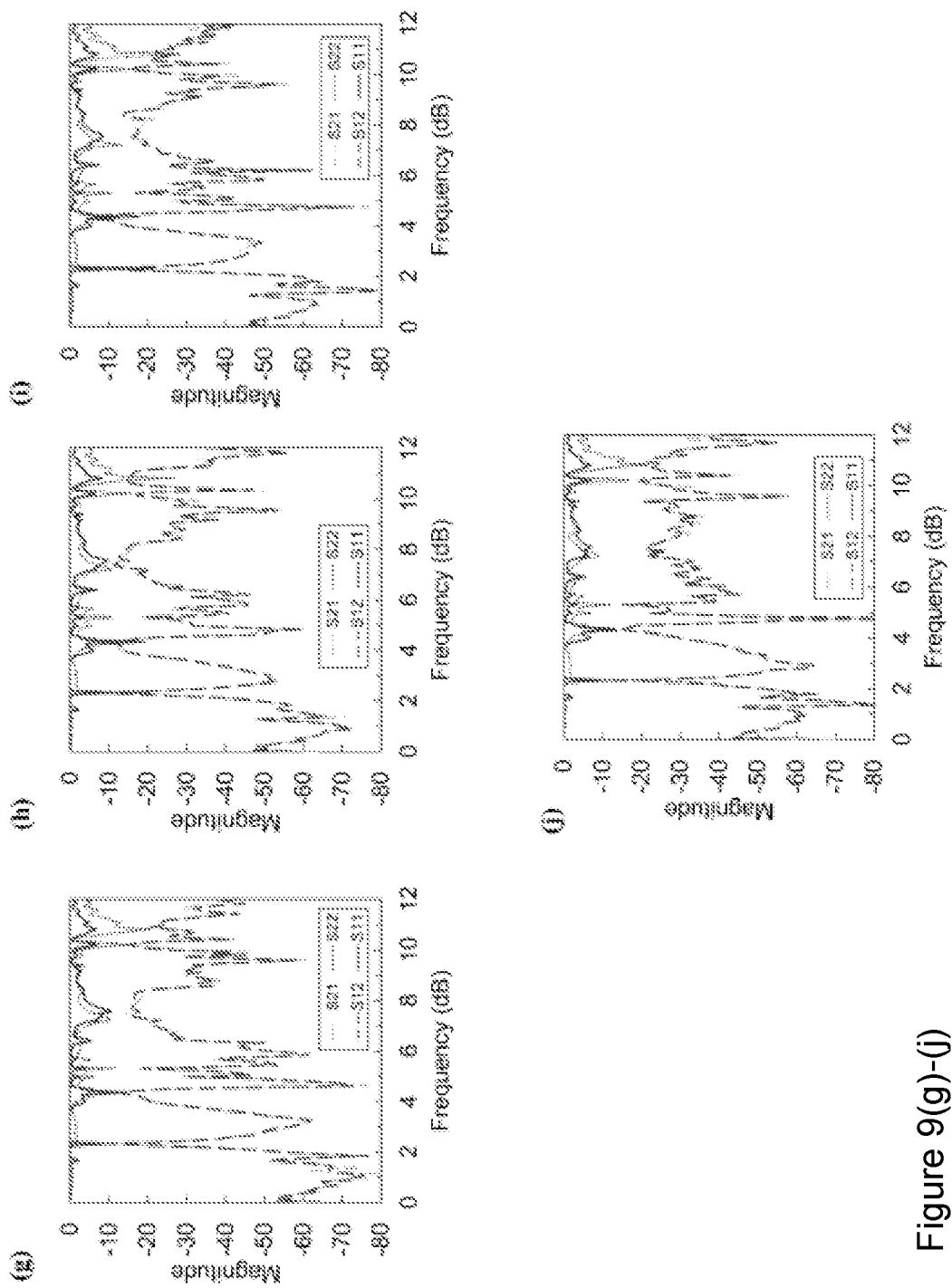
Figure 9(g)-(j)

METHOD OF ALIGNING A FIRST ALIGNABLE ELEMENT WITH A SECOND ALIGNABLE ELEMENT AND A SYSTEM IMPLEMENTING THE SAME

TECHNICAL FIELD

Disclosed herein is a method of aligning a first alignable element with a second alignable element and a system implementing the method.

BACKGROUND

The alignment of two or more components, or parts thereof, is important for many applications. For instance, the construction and manufacturing industries involve many applications where components need to be aligned for the application to function properly. Furthermore, the day-to-day use of many products involves the aligning of the product's individual components or verifying that components remain correctly aligned. Component misalignments can have cost implications and, in some cases, lead to safety issues.

Several methods exist for aligning components, surfaces, or axes. Laser alignment using pairs of laser beams fired at corresponding sensors have been used to align surfaces and shafts, for example. Dial indicators that mechanically measure offset distances are another familiar option. The choice of method may be determined based on balancing costs and desired accuracy in measuring alignment errors.

SUMMARY OF THE INVENTION

This summary is provided to introduce, in a simplified form, a selection of concepts that are further described below in the detailed description. This summary is not intended to identify key or essential features of the claimed subject-matter, nor is it intended to be used as an aid in determining the scope of the claimed subject-matter.

According to an aspect of this disclosure, there is provided a method of aligning a first alignable element with a second alignable element. A first article comprises the first alignable element and a second article comprises the second alignable element. A first antenna is coupled to the first alignable element and a second antenna is coupled to the second alignable element. The first antenna is identical to the second antenna. The method comprises: moving a first article relative to a second article; determining, during movement of the first article, at least one S-parameter of the first antenna and at least one corresponding S-parameter of the second antenna; and ceasing the movement of the first article when the at least one 5-parameter of the first antenna matches the at least one corresponding S-parameter of the second antenna. The at least one corresponding S-parameter corresponds to the at least one S-parameter.

According to another aspect of this disclosure, there is provided a system comprising: a first article comprising a first alignable element, wherein a first antenna is coupled to the first alignable element; a second article comprising a second alignable element, wherein the first article is movable relative to the second article, wherein a second antenna is coupled to the second alignable element, and wherein the second antenna is identical to the first antenna; a vector network analyser communicatively connected to the first antenna and to the second antenna; and a controller communicatively connected to the vector network analyser. The vector network analyser is configured to determine the at least one S-parameter of the first antenna and at least one corresponding S-parameter of the second antenna. The at least one corresponding S-parameter corresponds to the at least one S-parameter. The controller is configured to, in response to a determination that the at least one S-parameter does not match the at least one corresponding S-parameter, cause movement of the first article and/or second article and to, in response to a determination that the at least one S-parameter matches the at least one corresponding S-parameter, stop movement of the first article and/or second article.

According to another aspect of this disclosure, there is provided a non-transitory, machine-readable storage medium comprising instructions that, when executed by a processor, cause the processor to: move a first article relative to a second article, wherein the first article comprises a first alignable element and the second article comprises a second alignable element, wherein a first antenna is coupled to the first alignable element and a second antenna is coupled to the second alignable element, and wherein the first antenna is identical to the second antenna; determine, during movement of the first article, at least one S-parameter of the first antenna and at least one corresponding S-parameter of the second antenna; and cease the movement of the first article when the at least one S-parameter of the first antenna matches the at least one corresponding S-parameter of the second antenna.

Further features and advantages will become apparent from the following detailed description of certain examples, which are described with reference to the accompanying drawings.

BRIEF DESCRIPTION OF THE DRAWINGS

Embodiments disclosed herein will be described, by way of example, with reference to the following drawings, in which:

FIGS. 8(a) to 8(j) each schematically illustrate a particular alignment position for first and second antennas of the system of FIG. 1;

FIGS. 9(a) to 9(j) show the results of S-parameter measurements performed at corresponding antenna positions as illustrated in FIGS. 8(a) to 8(j).

DETAILED DESCRIPTION OF THE INVENTION

Figure 1:
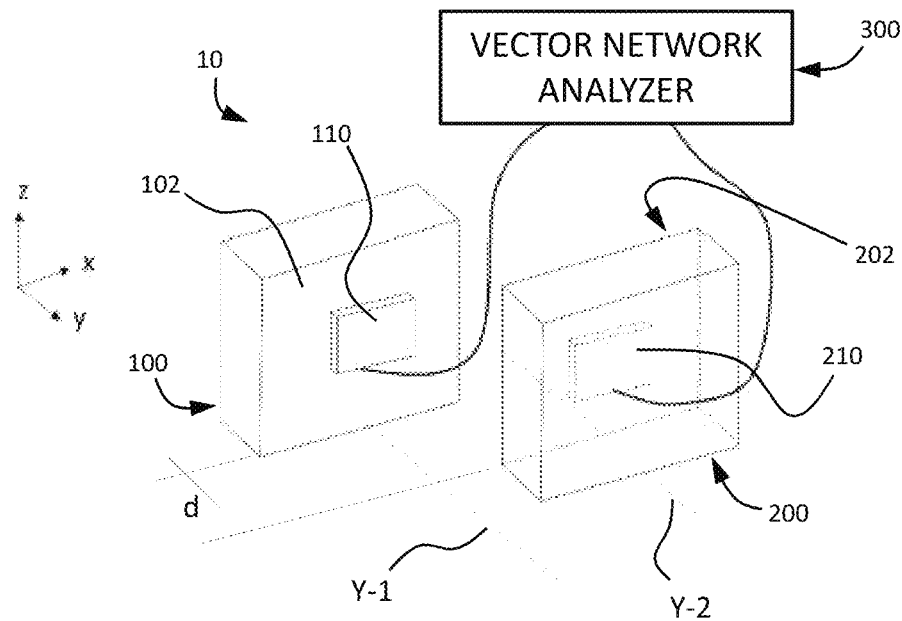
FIG. 1 is a schematic diagram illustrating an example of a system comprising a first article, a second article, and a vector network analyzer, as described herein.

The Applicant has found that two alignable elements can be aligned by using a pair of identical antennas. The alignable elements are movable relative to one another so that they can be aligned. Each alignable element may be part of an article, or object, or the alignable element may be the entire object itself. For instance, and purely by way of example, the alignable elements may be planar faces, axes defined by a feature of the articles, or a cylindrical or conical structure of the articles. Each antenna is coupled to one of the alignable elements such that the antenna moves with the corresponding alignable element. Any suitable radiating resonating element may be used as an antenna coupled to a respective alignable element.

To perform the alignment of the two alignable elements, selected S-parameters of each of the antennas are determined during movement of the two alignable elements. When the selected S-parameters match one another, i.e., are substantially equal to one another, then the two alignable elements are aligned and the motion of the two alignable elements can be stopped thereby leaving the two alignable elements in an aligned state. In this way, the S-parameters of the identical antennas can be used to adjust the distances between the alignable elements, the overlap of the alignable elements, and/or the relative angular positions of the alignable elements. Because the antennas are identical to one another, the S-parameters of each antenna will match the other when the antennas match each other's resonance state. For instance, the antennas may have a reflective symmetry state where the antennas resonate in the same state excepting that the antennas mirror one another in three-dimensional (3D) space. In another example, the antennas may be superimposed on each other in one or more dimensions such that the antennas resonate in the same state. Because the alignable elements are coupled to a corresponding antenna, the alignable elements are also aligned. In one example, to determine the S-parameters, for instance during motion of the alignable elements, each of the antennas is connected to a vector network analyser.

The example methods, processes, and/or systems described herein may be utilised across many industries. For instance, the example methods, processes, and/or systems described herein may particularly be applicable to the oil and gas, medical, construction, and aerospace industries. Using identical antenna pairs may help eliminate cumbersome equipment that is normally used in aligning items. For instance, the wireless nature of the antenna pairs means certain wired connections may be eliminated from alignment equipment. The use of identical antenna pairs to perform an alignment procedure may help eliminate cost in certain applications. For instance, in construction and manufacturing applications, the antennas may be used once and then left in situ in a building or completed product, for example. In other applications, the antennas may be used once and then disposed of. In other applications, such as medical devices or large, expensive pieces of medical equipment, construction equipment or mining equipment, for example, the antenna pairs may be part of a controlled mechanism that is used to align, or validate the alignment of, components. Such a mechanism can be automated using a controller such that there is minimal input required from a user other that to initiate the alignment process. Such controlled mechanisms can eliminate the need for a user to manually align components of devices or large pieces of equipment.

In the context of antennas, S-parameters, or scattering parameters, are used to describe the energy propagation between two (or more) antennas. For instance, S-parameters can be used to describe the energy input-output relationship between two antennas (which may be described as terminals) in an electrical network. Radio frequency (RF) systems are often analysed in terms of waves, i.e., amplitude and phase versus frequencies, rather than voltages and currents since these systems operate at high frequencies. Furthermore, open- and closed-circuit analysis is often not practicable with RF systems.

Two common S-parameters that are used to measure the performance of an antennas are transmission coefficients and reflection coefficients. The transmission coefficient of an antenna is a measure of the power transferred from one antenna to another. The reflection coefficient of an antenna is a measure of the power reflected from the antenna where power reflected from the antenna is not radiated by the antenna (or absorbed within the antenna itself). The reflection coefficient may also be known as the return loss. As antennas interact with their surroundings, the reflection coefficient of an antenna can change, for instance if the antenna is moved closer to or further away from another antenna. Similarly, the transmission coefficient of an antenna can change if the antenna is moved closer to a receiver.

When two antennas—antenna 1 and antenna 2—are arranged in an electrical network, then the transmission coefficient S12 represents the power transferred from antenna 2 to antenna 1. Similarly, the transmission coefficient S21 represents the power transferred from antenna 1 to antenna 2. For antenna 1, the reflection coefficient S11 represents the power reflected from antenna 1, in use. Similarly, for antenna 2, the reflection coefficient S22 represents the power reflected from antenna 2, in use. Transmission coefficients and reflection coefficients may be expressed as a ratio in decibels (dB). The transmission coefficients and reflection coefficients can be measured using a vector network analyzer.

The Applicant has conducted several tests to show how the methods and systems disclosed herein may be implemented to align two alignable elements using identical first and second antennas. The alignment methods and systems can be used to adjust the distances, overlaps, and angular positions of the two alignable elements.

FIG. 1 illustrates an example system used by the Applicant to demonstrate the methods described herein. The system 10 comprises a first article 100 and a second article 200. The system 10 is arranged in 3D space indicated by the cartesian co-ordinate system (X, Y, Z). The first article 100 comprises a first alignable element, in this case first substantially planar face 102 and the second article 200 comprises a second alignable element, in this case second substantially planar face 202. The first alignable element and the second alignable element are to be aligned with one another.

A first antenna 110 is coupled to the first planar face 102 and a second antenna 210 is coupled to the second planar face 202. In the example system, the Applicant used a pair substantially flat, loop antennas that were attached to the respective planar faces 102, 202 to conduct the tests. Any suitable type of antenna (i.e., radiating resonating element) may be used in place of the loop antenna—for instance, as described below, the pair of antennas may be a three-dimensional shape. The pair of antennas were attached to the planar faces with a suitable fixative. It will be understood that other antenna types, such as those described herein may be used. For example, a pair of identical patch antennas may instead be attached to the respective planar faces 102, 202 or a pair of identical loop antennas may be printed on the respective planar faces 102, 202.

A vector network analyzer 300 is communicatively connected to the first antenna 110 and to the second antenna 210 to measure the S-parameters of the system 10. The vector network analyzer 300 is configured to measure at least one S-parameter of the first antenna 110 and at least one corresponding S-parameter of the second antenna 210. The at least one corresponding S-parameter of the second antenna 210 corresponds to the at least one 5-parameter of the first antenna 110 in that the at least one S-parameter and the at least one corresponding S-parameter are the same type of numerical factor that define an aspect of antenna performance.

The first and second articles 100, 200 are movable relative to one another. In the example shown in FIG. 1, the first article 100 is separated—initially, before alignment—from the second article 200 by a distance d in the Y-direction.

In the example of FIG. 1, the first planar face 102 and the second planar face 202 are alignable in that they are matching in terms of size, surface contour, and shape. The first antenna 110 is attached in the same relative position on the first planar face 102 as the second antenna 210 is attached on the second planar face 102. Thus, alignment of the first antenna 110 and the second antenna 210 using the at least one S-parameter of the first antenna 110 and at least one corresponding S-parameter of the second antenna 210 means results in perfect alignment of the first planar face 102 and the second planar face 202. With reference to FIG. 1, the first article 100 is movable relative to the second article 200 until the first article axis Y-1 is coincident with the second article axis Y-1. Both the first article axis Y-1 and the second article axis Y-1 are aligned with the Y-direction in this example, but this does not need to be the case for other examples where axes could project in any suitable direction. Once the first article 100 is positioned relative to the second article 200 so that the first article axis Y-1 is coincident with the second article axis Y-1, then the reflection coefficient of the first antenna 110 and the reflection coefficient of the second antenna 210 are the same, i.e., S11 is equal to S22. The transmission coefficient of the first antenna 110 and the transmission coefficient of the second antenna 210 are the same, i.e., S21 is equal to S12. In contrast, when the first article 100 is positioned relative to the second article 200 so that the first article axis Y-1 is not coincident with the second article axis Y-1, in other words the first article 100 is positioned relative to the second article 200 so that the first planar face 102 and the second planar face 202 are misaligned, the reflection coefficients of the first antenna 110 and the second antenna 210 will differ. Similarly, the transmission coefficients of the first antenna 110 and the second antenna 210 will differ.

Figure 2A:
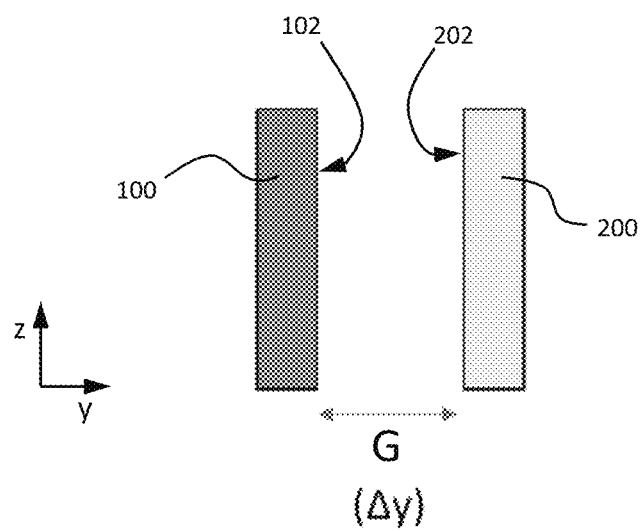
FIGS. 2(a), 2(b), and 2(c) schematically illustrate gap alignment, offset alignment, and angular alignment for first and second planar faces from the system illustrated in FIG. 1.
Figure 2B:
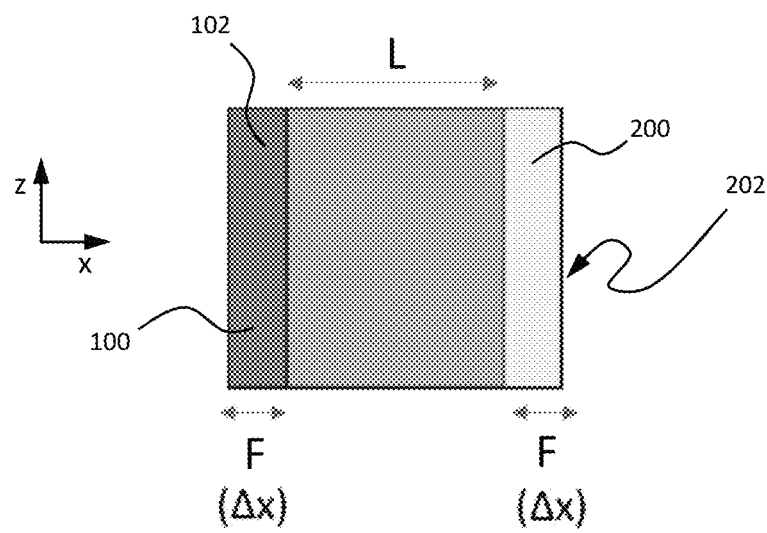
Figure 2C:
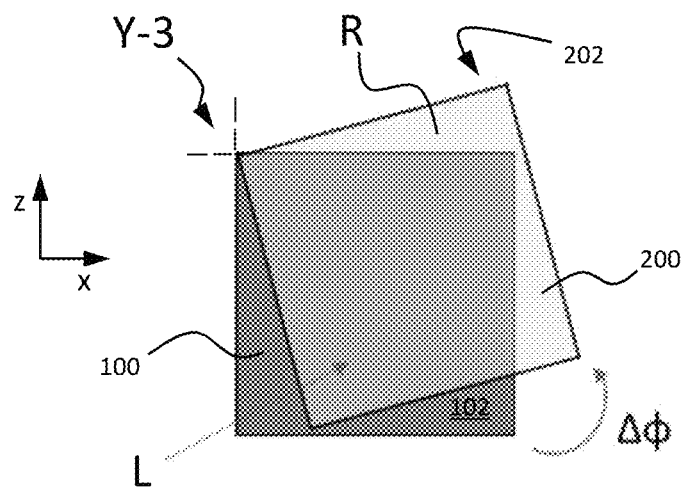

Following testing, the Applicant considers that the alignment methods described herein can be placed in two categories: gap alignment; and angular and offset alignment. These categories of alignment are schematically illustrated in FIGS. 2(a), 2(b), and 2(c), which illustrate first and second substantially planar faces 102, 202 in various arrangements before alignment. For the sake of clarity, the first and second antennas 110, 210 are not illustrated in these figures. As with FIG. 1, in each of the illustrated system 10 examples, a first article 100 comprises the first planar face 102 and a second article 200 comprises the second planar face 202. In each case, the first planar face 102 and the second planar face 202 each have the same size and geometry, i.e., the same dimensions, and comprise substantially planar surfaces. In this instance, the first article 100 and the second article 200 also have the same size and geometry. The first and second articles 100, 200 are arranged with reference to the same coordinate system as FIG. 1.

FIG. 2(a) schematically illustrates gap alignment between the first and second planar faces 102, 202; that is the alignment of the first and second planar faces 102, 202 by closing the gap between then so that they are flush with, or even with, one another. A gap G can be closed by moving the first and second planar faces 102, 202 towards one another. The gap G may be defined, in this example, as the variable distance $\Delta y$ in the Y-direction. Alignment of the first and second planar faces 102, 202 is achieved by varying the distance $\Delta y$ to the desired value as determined by monitoring the selected S-parameters of the pair of first and second antennas 110, 210.

FIG. 2(b) schematically illustrates offset alignment between the first and second planar faces 102, 202; that is the alignment of the first and second planar faces 102, 202 by moving the first and/or second articles 100, 200 in a direction parallel to the first and/or second planar faces 102, 202 so that one of the first or second planar faces 102, 202 moves to completely cover the other of the first or second planar faces 102, 202. This motion may also be described as motion in a plane of the first and/or second planar faces 102, 202 or as being in two dimensions. One of the first or second planar faces 102, 202 may be described as masking the other of the first or second planar faces 102, 202 once alignment is complete. Furthermore, the geometry, such as the edges or contours, of each of the first and second planar faces 102, 202 may also be said to be in alignment when viewed from a perpendicular viewpoint relative to the first and second planar faces 102, 202. An offset F may be defined, in this example, as the variable offset distance $\Delta x$ in the X-direction. As can be seen in FIG. 2(b), offset alignment involves moving one of the first and/or second planar faces 102, 202 over the other of the first and/or second planar faces 102, 202 to reduce the offset F to the desired value of $\Delta x$ as determined by monitoring the selected S-parameters of the pair of first and second antennas 110, 210. Once aligned, an overlapping area L will be equal to the areas of both the first or second planar faces 102, 202.

FIG. 2(c) schematically illustrates angular alignment between the first and second planar faces 102, 202; that is the alignment of the first and second planar faces 102, 202 by rotationally moving the first and/or second articles 100, 200 in a direction parallel to the first and/or second planar faces 102, 202 about an axis. Again, as with FIG. 2(b), the rotational motion is in a plane of the first and/or second planar faces 102, 202 but rotational rather than translational. In the example shown in FIG. 2(c), the first and/or second articles 100, 200 are rotated about an axis Y-3 that extends in the in Y-direction, i.e., perpendicular to the first and/or second planar faces 102, 202. Axis Y-3 passes through one of the corners of the first and/or second planar faces 102, 202 but could be located anywhere in the X-Z plane. As with FIG. 2(b), the relative rotational motion between the first and second planar faces 102, 202 causes one of the first or second planar faces 102, 202 to move to completely cover, or mask, the other of the first or second planar faces 102, 202. Again, the geometry, such as the edges or contours, of each of the first and second planar faces 102, 202 may also be said to be in alignment when viewed from a perpendicular viewpoint relative to the first and second planar faces 102, 202. An angular offset R may be defined, in this example, as the variable angle A about the axis Y-3. As can be seen in FIG. 2(c), angular alignment involves rotationally moving one of the first and/or second planar faces 102, 202 over the other of the first and/or second planar faces 102, 202 to reduce the angular offset R to the desired value of $\Delta \varphi$ as determined by monitoring the selected S-parameters of the pair of first and second antennas 110, 210. Once aligned, an overlapping area L will be equal to the areas of both the first or second planar faces 102, 202.

Figure 3:
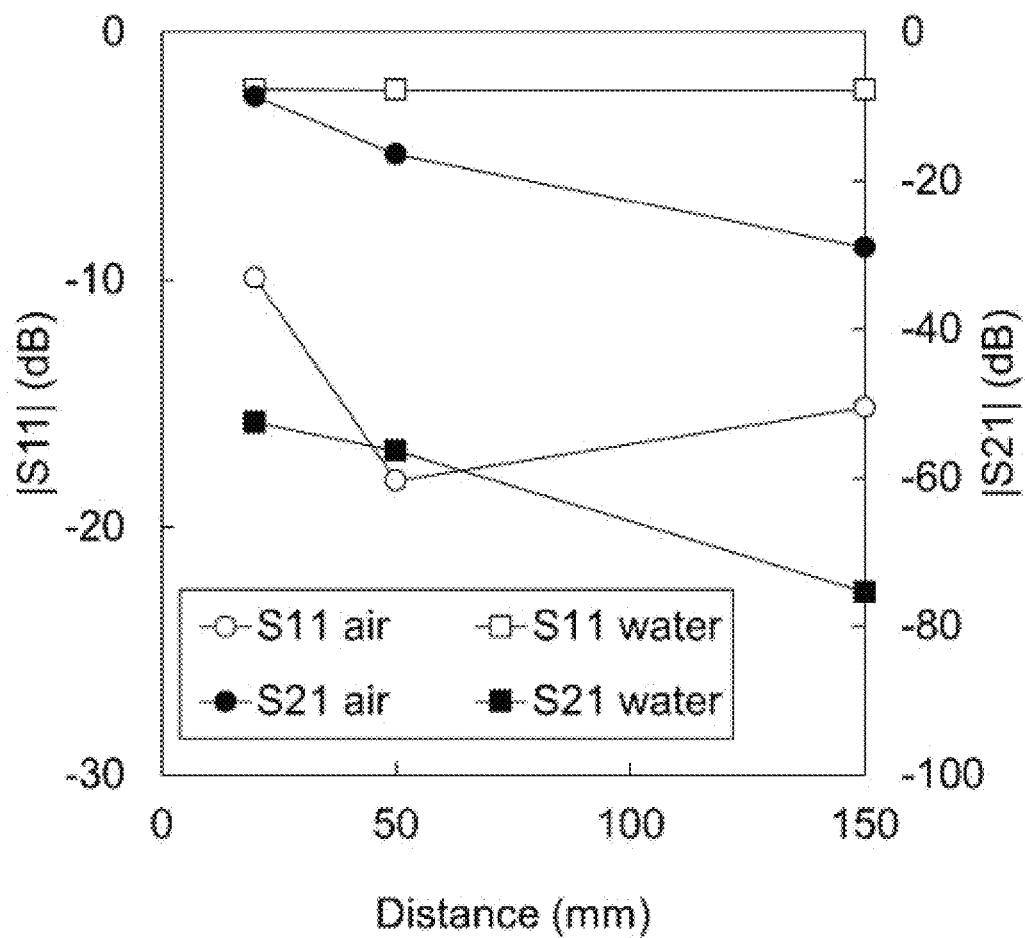
FIG. 3 graphically illustrates results of testing on the systems shown in FIGS. 1 and 2(a)

The Applicant has found that antenna transmission coefficients can be used for managing gap alignment(s) and that antenna reflection coefficients can be used for offset alignment(s) and angular alignment(s). FIG. 3 graphically illustrates a sample of the results of the Applicant's testing on the systems 10 shown in FIGS. 1 and 2, which serve to demonstrate the how the antenna S-parameters can be used to determine an alignment state of two alignable elements.

In particular, FIG. 3 shows the results of S-parameter measurements performed at three distances $\Delta y$, i.e., gaps G, where the first article axis Y-1 is coincident with the second article axis Y-1. For the sake of clarity, FIG. 3 only illustrates S11 and S21 since, as explained above with reference to the arrangement shown in FIG. 1, once the first article axis Y-1 is coincident with the second article axis Y-1, S11 is equal to S22 and S21 is equal to S12. The measurements were taken as the antenna pairs operated in two different media: air and water. As can be seen in FIG. 3, as the distance $\Delta y$ increases, the transmission coefficient S21 drops. The relationship between distance $\Delta y$ and transmission coefficient S21 shows the same trend or behaviour in both media and therefore the transmission coefficient S21 (or S12) can be used to manage the gap alignment of the first and second articles 100, 200.

Mathematically, the relationship between the S21 and distance in an antenna near field region for two identical antennas can be expressed as:

$$S_{21} = \left(\frac{G^2}{4}\right)\left(\frac{1}{(kd)^2} - \frac{1}{(kd)^4} - \frac{1}{(kd)^6}\right)$$

Where G is the gain of the antennas, k is the wave number in the media, and d is the separation between the antennas.

Figure 4:
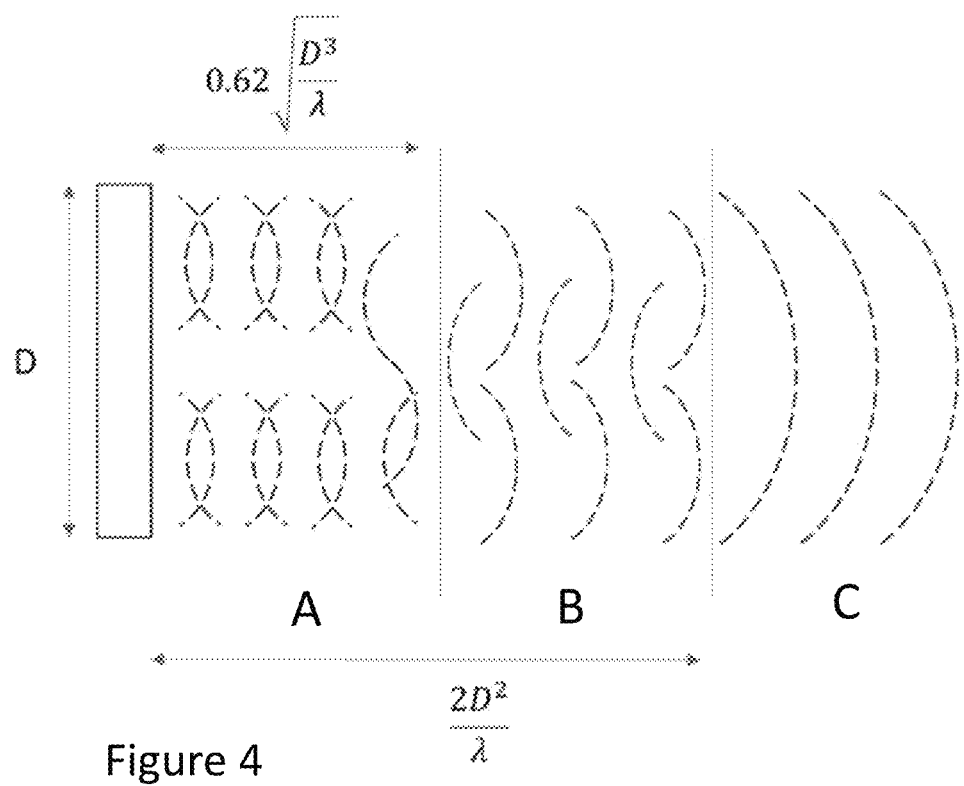
FIG. 4 schematically illustrates the three segregated regions of an antenna radiating field.

As is understood, an antenna radiating field can be segregated in to three regions: the reactive near field, the radiative near field, and the radiative far field. These radiative regions are shown in FIG. 4, which also illustrates the radiative field structure within these regions. The reactive near field is the region A immediately close the antenna in which propagation does not occur since the E-field and H-field are 90° out of phase with each other. In region A, the fields are principally reactive fields. This region is delineated by a distance given by the equation:

$$d < 0.62\sqrt{\frac{D^3}{\lambda}}$$

Where d is the distance and D is the largest linear dimension of the antenna and $\lambda$ is the wavelength.

Immediately after the reactive near field is the radiating near field indicated in FIG. 4 as region B. In region B, the radiating fields start to dominate, and the angular field distribution is distance dependent. Region B may not exist for some antennas if the if the antenna maximum dimension is not large enough compared to the radiated wavelength. The region is given by the equation:

$$0.62\sqrt{\frac{D^3}{\lambda}} < d < \frac{2D^2}{\lambda}$$

The furthest region C is the radiative far field. Region C has a principally radiated field since the E-field and H-field are orthogonal to each other and in phase. This region is demarcated by:

$$d > \frac{2D^2}{\lambda}$$

Table 1, set out below, shows the calculated antenna radiation regions for the S-parameter measurements performed in air and water as described above with respect to FIG. 3.

TABLE 1

Calculated antenna radiation regions for the antennas used in S-parameter measurements in air and water

| Medium | Reactive near field (mm) | Radiative near field (mm) | Radiative far field (mm) |
|---|---|---|---|
| Air | <13.73 | 13.73 < d < 24.5 | d > 24.5 |
| Water | <41.07 | 41.07 < d < 219.43 | d > 219.43 |

Comparing this table with the results shown in FIG. 3 shows that, for the measurements performed when the antennas were operating in air, the first measurement was obtained in the radiative near field (between 13.73 mm and 24.5 mm) and the other two measurements were obtained in the radiative far field. For the measurements performed when the antennas were operating in water, the first measurement was obtained in the reactive near field (below 41.07 mm), while the other measurements were obtained in the radiative near field (between 41.07 mm and 219.43 mm).

In the far field, the radiated power decreases with the inverse square of distance while, in the near field, the power decreases much more rapidly—with the inverse fourth power of distance. This explains why the S21 plots in air and water in FIG. 3 do not follow a similar trend or behaviour.

Based on the results of the testing on the systems described herein, the Applicant considers that the operating frequency of the first and second antennas (which are RF resonating structures) may be up to 300 GHz. It will also be understood that the methods described herein can be performed, executed and/or implemented in any type of RF resonating structure. For instance, the RF resonating structure may be flexible or rigid, and hollow or solid. Furthermore, a RF resonating structure in which the methods described herein are performed, executed and/or implemented need not necessarily be radiated by another RF resonating structure. As mentioned above, the RF resonating structure may integrated with, fixed to, printed on, or otherwise coupled with the alignable element of an article.

It will be understood that the RF resonating structures and alignable elements may be any suitable shape or structure and not limited to the alignable planar faces described herein. For instance, the RF resonating structures and/or alignable elements may be: cylindrical, conical, rod-like, rectangular prisms, horns, helical, dish-shaped, or dipoles.

It will also be understood that, in some applications, more than one alignment procedure will conducted at the same time. For instance, a gap alignment procedure may be performed on the alignable elements at the same time as an angular alignment.

Figure 5:
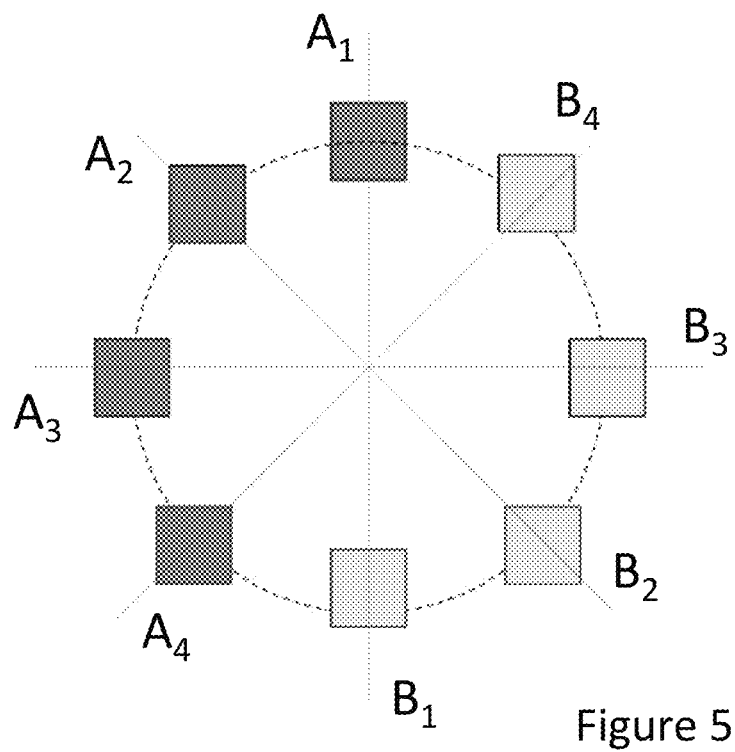
FIG. 5 is a schematic diagram illustrating an example of a system comprising multiple antenna pairs used for use in an alignment method.

Multiple pairs of antennas can also be employed in implementing the methods and systems described herein. For instance, any of the systems described herein may comprise a plurality of first antenna, second antenna pairs. The first antenna and the second antenna of each pair of antennas are identical to one another. Antennas of each pair may or may not be identical to the antennas of other antenna pairs of the plurality of first antenna, second antenna pairs. FIG. 5 illustrates one such example, in which four pairs of antennas— ($A_1$, $B_1$), ($A_2$, $B_2$), ($A_3$, $B_3$) ($A_4$, $B_4$)— are arranged in multiple locations. Antenna $A_1$ is identical to antenna $B_1$ and Antenna $A_2$ is identical to antenna $B_2$ and so forth. The use of multiple antennas in multiple locations can be used to increase the degrees of freedom for alignment. For instance, in the example of FIG. 5, each pair of antennas is used for gap alignment along a coinciding axis of each pair of antennas. This arrangement allows for four degrees of freedom for gap alignment.

In certain examples, for systems and methods employing multiple pairs of antennas, first antennas from each pair of antennas are all coupled to a first alignable element of a first article and second antennas from each pair of antennas are all coupled to a second alignable element of a second article. Such an arrangement may be beneficial to provide redundancy and allow for failures in the alignment methods and systems described herein. Furthermore, multiple antenna pairs used on a first alignable element and second alignable elements can improve the accuracy and reliability of the alignment methods and systems described herein of a second article.

In some examples, for systems and methods employing multiple pairs of antennas, first antennas from each pair of antennas are each coupled to different first alignable elements of a first article and second antennas from each pair of antennas are each coupled to different second alignable element of a second article. In this way, different alignable elements of a first article can be aligned with corresponding alignable elements of a second article. Multiple antenna pairs used in such an arrangement may be beneficial in that different alignable facets of the first and second articles can be aligned at the same time. In other examples, for systems and methods employing multiple pairs of antennas, first antennas from each pair of antennas are each coupled to different first alignable elements of different first articles and second antennas from each pair of antennas are each coupled to different second alignable elements of different second articles. In this way, first and second alignable facets of different articles can be aligned at the same time.

Certain example methods and/or processes will now be described. The methods and/or processes may be performed, executed and/or implemented in any of the example systems described herein and illustrated in any of the Figures.

Figure 6:
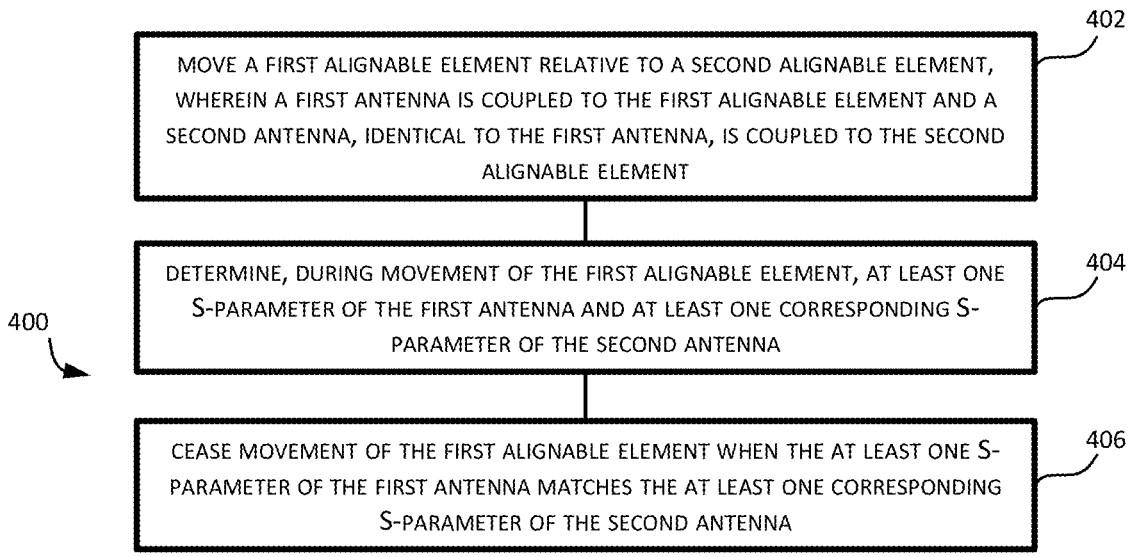
FIG. 6 is a flow diagram of an example method of aligning a first alignable element with a second alignable element.

A method 400 of aligning a first alignable element with a second alignable element is shown in the flow diagram of FIG. 6. The method comprises, at 402, moving a first article relative to a second article. The first article comprises the first alignable element and the second article comprises the second alignable element. A first antenna is coupled to the first alignable element and a second antenna, identical to the first antenna, is coupled to the second alignable element. At 404, the method comprises determining, during movement of the first article, at least one S-parameter of the first antenna and at least one corresponding S-parameter of the second antenna. The at least one corresponding S-parameter corresponds to the at least one S-parameter in that these S-parameters are the same type of performance factor of the antennas. The method comprises, at 406, ceasing the movement of the first article when the at least one S-parameter of the first antenna matches the at least one corresponding S-parameter of the second antenna. In other words, the at least one S-parameter is substantially equal to the at least one corresponding S-parameter.

In certain examples, the method comprises determining a transmission coefficient of the first antenna and determining a corresponding transmission coefficient of the second antenna. In certain examples, the method comprises determining a reflection coefficient of the first antenna and determining a corresponding reflection coefficient of the second antenna. The at least one S-parameter and the at least one corresponding S-parameter may be determined with a vector network analyser connected to the first antenna and to the second antenna.

The method may comprise moving the first article relative to the second article by translating and/or rotating the first article relative to the second article.

In certain examples, where the first alignable element comprises a first substantially planar face and wherein the second alignable element comprises a second substantially planar face that is substantially parallel to the first substantially planar face, the method may comprise moving the first substantially planar face towards or away from the second substantially planar face. For instance, moving the first substantially planar face towards the second substantially planar face may close a gap between the first substantially planar face and the second substantially planar face.

In certain examples, where the first alignable element comprises a first substantially planar face and wherein the second alignable element comprises a second substantially planar face that is substantially parallel to the first substantially planar face, the method may comprise moving the first substantially planar face in parallel to the second substantially planar face. For instance, moving the first substantially planar face in parallel to the second substantially planar face may allow the first substantially planar face to be completely overlapped or completely covered with the second substantially planar face so that edges of the first substantially planar face are aligned with counterpart edges of the second substantially planar face.

In certain examples, where the first alignable element comprises a first substantially planar face and wherein the second alignable element comprises a second substantially planar face that is substantially parallel to the first substantially planar face, the method may comprise rotating the first substantially planar face about an axis extending perpendicular to the first and/or the second substantially planar face. For instance, rotating the first substantially planar face in parallel to the second substantially planar face may allow the first substantially planar face to be completely overlapped or completely covered with the second substantially planar face so that edges of the first substantially planar face are aligned with counterpart edges of the second substantially planar face.

In certain examples, where the first alignable element comprises a first axis and wherein the second alignable element comprises a second axis that is substantially parallel to the first axis, the method may comprise moving the first axis towards the second axis. For instance, the first alignable element and second alignable element may each comprise a cylindrical structure, where each defines in turn a corresponding alignable axis.

In certain examples, the method comprises resonating the first antenna at up to 300 GHz and/or resonating the second antenna at up to 300 GHz The methods and/or processes may be performed, executed and/or implemented a system, for example system 10 described herein. The system comprises: a first article comprising a first alignable element, wherein a first antenna is coupled to the first alignable element; a second article comprising a second alignable element, wherein the first article is movable relative to the second article, wherein a second antenna is coupled to the second alignable element, and wherein the second antenna is identical to the first antenna; a vector network analyser communicatively connected to the first antenna and to the second antenna, wherein the vector network analyser is configured to determine the at least one S-parameter of the first antenna and at least one corresponding S-parameter of the second antenna; and a controller communicatively connected to the vector network analyser, the controller configured to, in response to a determination that the at least one S-parameter does not match the at least one corresponding S-parameter, cause movement of the first article and/or second article and to, in response to a determination that the at least one S-parameter matches the at least one corresponding S-parameter, stop movement of the first article and/or second article.

The first and second alignable elements may be considered alignable in that they, for example, match one another in form, structure, or geometry. For instance, the alignable elements may comprise corresponding flat/planar faces, corresponding cylindrical structures, or have matching outlines and/or shapes. It will be understood that the first and second alignable elements may have only one particular feature that is alignable, such as a planar surface. For instance, the first and second alignable elements may each comprise corresponding planar surfaces yet have differing overall outlines and still be alignable using correspondingly flat antennas that are mounted on their respective planar surfaces.

The first and second antennas may be configured to match the first and second alignable elements in form, structure, or geometry. For instance, the antennas may be flat, cylindrical, helical, or conical in shape. The first and second antennas may also be coupled to their respective alignable element in the same relative position thereby allowing each antenna to have the same resonant properties relative with respect to the operating environment, which includes, for each antenna, the other alignable element and antenna.

In certain examples, the first and second antennas are fixed to the respective first and second alignable elements. In certain examples, the first and second antennas are printed on the respective first and second alignable elements. In certain examples, the first and second antennas are formed integrally with the respective first and second alignable elements.

Any suitable antenna may be used. For instance, the first antenna and/or second antenna may be selected from the group comprising: a patch antenna, a loop antenna, a monopole antenna, a dipole antenna, a parabolic reflector antenna, a helical antenna, a slot antenna, or a horn antenna.

In certain examples, the first alignable element comprises a first substantially planar face and the second alignable element comprises a second substantially planar face, and wherein the first antenna lies substantially parallel to the first planar face and the second antenna lies substantially parallel to the second planar face.

In certain examples, the first alignable element comprises a first substantially conical or cylindrical structure and the second alignable element comprises a second substantially conical or cylindrical structure, and wherein the first antenna is helically coiled about the first structure and the second antenna is helically coiled about the second structure.

Figure 7:
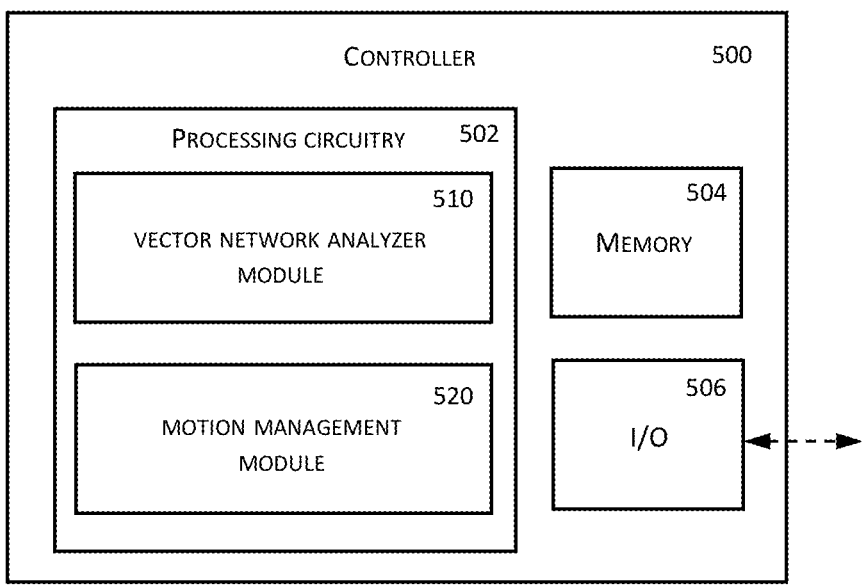
FIG. 7 is a schematic diagram of an example controller of a system as described herein.

In some examples, the methods described herein, and shown in FIGS. 6, may be carried out in using processing circuitry provided in the controller of the system described above. An example of the controller 500 is shown in FIG. 7. The controller comprises processing circuitry 502, a storage module 504, for instance to store machine readable instructions that are executable by the processing circuitry and/or store data usable by the controller 500, and a communications interface 506 to communicatively couple the controller 500 to the rest of the system. The processing circuitry 502 of the controller 500 can cause the method blocks described above to be carried out by the system described above.

In certain examples, the controller 500 comprises: a vector network analyser module 510 to obtain S-parameter data and corresponding S-parameter data from the vector network analyser; and a motion management module 520 to compare the S-parameter data with the corresponding S-parameter data, and to, based on the comparison, determine whether the first second and/or second article are to be moved so that at least one S-parameter matches the at least one corresponding S-parameter.

The communications interface 506 may communicatively couple the controller 500 to other parts of the system as described herein. For instance, the communications interface 506 may communicatively couple the controller 500 to the vector network analyzer. The communications interface 506 may communicatively couple the controller 500 to actuators that are configured to move the first and/or second articles of the system. For example, the controller 500 may send activation instructions to, or initiate activation of the actuators, via the communications interface 506 thereby causing the first and/or second articles to be moved for alignment purposes.

In certain examples, the storage module 504 may comprise machine readable instructions that are executable by the processing circuitry to cause the controller to: move a first article relative to a second article, wherein the first article comprises a first alignable element and the second article comprises a second alignable element, wherein a first antenna is coupled to the first alignable element and a second antenna is coupled to the second alignable element, and wherein the first antenna is identical to the second antenna; determine, during movement of the first article, at least one S-parameter of the first antenna and at least one corresponding S-parameter of the second antenna; and cease the movement of the first article when the at least one S-parameter of the first antenna matches the at least one corresponding 5-parameter of the second antenna.

The Applicant conducted extensive testing using the system illustrated with respect to FIG. 1 for multiple alignment positions. FIGS. 9(a) to 9(j) show the results of S-parameter measurements performed at corresponding antenna 110, 210 positions as illustrated in FIGS. 8(a) to 8(j). In FIGS. 8(a) to 8(e), the instant antenna alignment positions are illustrated in a viewing direction perpendicular to Z-X plane. For FIGS. 8(f) to 8(i), the instant antenna alignment positions are illustrated in a viewing direction perpendicular to Z-Y plane. For FIGS. 8(f) to 8(i), the instant antenna alignment position is illustrated in a viewing direction perpendicular to Z-X plane. FIGS. 9(a) to 9(j) show S21, S12, S22, and S11 for each of the corresponding antenna positions illustrated in FIGS. 8(a) to 8(j). Hence, FIG. 9(a) shows the S-parameter measurements for the instant antenna alignment position is illustrated in FIG. 8(a) and so on.

It will be understood that the above embodiment descriptions are given by way of example only and that various modifications may be made by those skilled in the art. Although various embodiments have been described above with a certain degree of particularity, or with reference to one or more individual embodiments, those skilled in the art could make numerous alterations to the disclosed embodiments without departing from the scope of this invention. It is to be understood that any feature described in relation to one example may be used alone, or in combination with other features described, and may also be used in combination with any features of any other of the examples, or any combination of any other examples.

The invention claimed is:

1. A method of aligning a first alignable element with a second alignable element, the method comprising:
    moving a first article relative to a second article, wherein the first article comprises the first alignable element and the second article comprises the second alignable element, wherein a first antenna is coupled to the first alignable element and a second antenna is coupled to the second alignable element, and wherein the first antenna is identical to the second antenna;
    determining, during movement of the first article, at least one S-parameter of the first antenna and at least one corresponding S-parameter of the second antenna, wherein determining the at least one S-parameter and the at least one corresponding S-parameter comprises determining a reflection coefficient of the first antenna and determining a corresponding reflection coefficient of the second antenna; and
    ceasing the movement of the first article when the at least one S-parameter of the first antenna matches the at least one corresponding S-parameter of the second antenna.

2. The method of claim 1, wherein determining the at least one S-parameter and the at least one corresponding S-parameter comprises determining a transmission coefficient of the first antenna and determining a corresponding transmission coefficient of the second antenna.

3. The method of claim 1, wherein the at least one S-parameter and the at least one corresponding S-parameter are determined with a vector network analyser connected to the first antenna and to the second antenna.

4. The method of claim 1, wherein moving the first article relative to the second article comprises translating the first article relative to the second article.

5. The method of claim 1, wherein moving the first article relative to the second article comprises rotating the first article relative to the second article.

6. The method of claim 1, wherein the first alignable element comprises a first substantially planar face and wherein the second alignable element comprises a second substantially planar face that is substantially parallel to the first substantially planar face, and wherein moving the first article relative to the second article comprises moving the first substantially planar face towards the second substantially planar face.

7. The method of claim 1, wherein the first alignable element comprises a first substantially planar face and wherein the second alignable element comprises a second substantially planar face that is substantially parallel to the first substantially planar face, and wherein moving the first article relative to the second article comprises moving the first substantially planar face in parallel to the second substantially planar face.

8. The method of claim 1, wherein the first alignable element comprises a first substantially planar face and wherein the second alignable element comprises a second substantially planar face that is substantially parallel to the first substantially planar face, and wherein moving the first article relative to the second article comprises rotating the first substantially planar face about an axis extending perpendicular to the first and/or the second substantially planar.

9. The method of claim 1, wherein the first alignable element comprises a first axis and wherein the second alignable element comprises a second axis that is substantially parallel to the first axis, and wherein moving the first article relative to the second article comprises moving the first axis towards the second axis.

10. The method of claim 1, wherein the method comprises resonating the first antenna at up to 300 GHz and/or resonating the second antenna at up to 300 GHz.

11. A system comprising:
    a first article comprising a first alignable element, wherein a first antenna is coupled to the first alignable element;
    a second article comprising a second alignable element, wherein the first article is movable relative to the second article, wherein a second antenna is coupled to the second alignable element, and wherein the second antenna is identical to the first antenna;
    a vector network analyser communicatively connected to the first antenna and to the second antenna, wherein the vector network analyser is configured to determine the at least one S-parameter of the first antenna and at least one corresponding S-parameter of the second antenna, wherein determining the at least one S-parameter and the at least one corresponding S-parameter comprises determining a reflection coefficient of the first antenna and determining a corresponding reflection coefficient of the second antenna; and
    a controller communicatively connected to the vector network analyser, the controller configured to, in response to a determination that the at least one S-parameter does not match the at least one corresponding S-parameter, cause movement of the first article and/or second article and to, in response to a determination that the at least one S-parameter matches the at least one corresponding S-parameter, stop movement of the first article and/or second article.

12. The system of claim 11, wherein the first antenna is fixed to the first alignable element and the second antenna is fixed to the second alignable element.

13. The system of claim 11, wherein the first antenna is printed on the first alignable element and the second antenna is printed on the second alignable element.

14. The system of claim 11, wherein the first antenna is integral with the first alignable element and the second antenna is integral with the second alignable element.

15. The system of claim 11, wherein the first antenna and/or second antenna is selected from the group comprising: a patch antenna, a loop antenna, a monopole antenna, a dipole antenna, a parabolic reflector antenna, a helical antenna, a slot antenna, or a horn antenna.

16. The system of claim 11, wherein the first alignable element comprises a first substantially planar face and the second alignable element comprises a second substantially planar face, and wherein the first antenna lies substantially parallel to the first planar face and the second antenna lies substantially parallel to the second planar face.

17. The system of claim 11, wherein the first alignable element comprises a first substantially conical or cylindrical structure and the second alignable element comprises a second substantially conical or cylindrical structure, and wherein the first antenna is helically coiled about the first structure and the second antenna is helically coiled about the second structure.

18. The system of claim 11, wherein the controller comprises:

a vector network analyser module to obtain S-parameter data and corresponding S-parameter data from the vector network analyser; and a motion management module to compare the S-parameter data with the corresponding S-parameter data, and to, based on the comparison, determine whether the first second and/or second article are to be moved so that at least one S-parameter matches the at least one corresponding S-parameter.

19. A non-transitory, machine-readable storage medium comprising instructions that, when executed by a processor, cause the processor to:

move a first article relative to a second article, wherein the first article comprises a first alignable element and the second article comprises a second alignable element, wherein a first antenna is coupled to the first alignable element and a second antenna is coupled to the second alignable element, and wherein the first antenna is identical to the second antenna;

determine, during movement of the first article, at least one S-parameter of the first antenna and at least one corresponding S-parameter of the second antenna, wherein determining the at least one S-parameter and the at least one corresponding S-parameter comprises determining a reflection coefficient of the first antenna and determining a corresponding reflection coefficient of the second antenna; and cease the movement of the first article when the at least one S-parameter of the first antenna matches the at least one corresponding S-parameter of the second antenna.

* * * * *